United States Patent
Nakatsugawa et al.

(10) Patent No.: US 10,811,950 B2
(45) Date of Patent: Oct. 20, 2020

(54) LINEAR MOTOR AND DEVICE PROVIDED WITH LINEAR MOTOR

(71) Applicant: Hitachi, Ltd., Chiyoda-ku, Tokyo (JP)

(72) Inventors: Junnosuke Nakatsugawa, Tokyo (JP); Yasuaki Aoyama, Tokyo (JP)

(73) Assignee: Hitachi, Ltd., Tokyo (JP)

(*) Notice: Subject to any disclaimer, the term of this patent is extended or adjusted under 35 U.S.C. 154(b) by 391 days.

(21) Appl. No.: 15/746,937

(22) PCT Filed: Aug. 7, 2015

(86) PCT No.: PCT/JP2015/072441
§ 371 (c)(1),
(2) Date: Jan. 23, 2018

(87) PCT Pub. No.: WO2017/025998
PCT Pub. Date: Feb. 16, 2017

(65) Prior Publication Data
US 2020/0083792 A1    Mar. 12, 2020

(51) Int. Cl.
*H02K 41/03* (2006.01)
*H02K 1/14* (2006.01)

(52) U.S. Cl.
CPC ............. *H02K 41/033* (2013.01); *H02K 1/14* (2013.01)

(58) Field of Classification Search
CPC ......... H02K 41/031; H02K 1/14; H02K 17/02
USPC ...................... 310/12.01, 12.23, 12.25, 12.31
See application file for complete search history.

(56) References Cited

U.S. PATENT DOCUMENTS

| | | | | |
|---|---|---|---|---|
| 6,614,137 B2* | 9/2003 | Joong | .................. | H02K 41/031 310/12.21 |
| 7,654,540 B2* | 2/2010 | Parison | .............. | B60G 17/0157 280/5.5 |
| 7,804,210 B2* | 9/2010 | O'Day | .................. | G01D 5/244 310/68 B |
| 9,071,124 B2* | 6/2015 | Kawakami | ............. | H02K 41/02 |
| 2002/0053835 A1* | 5/2002 | Joong | .................. | H02K 41/031 310/12.21 |

(Continued)

FOREIGN PATENT DOCUMENTS

| | | |
|---|---|---|
| JP | 2003-244925 A | 8/2003 |
| JP | 2005-80317 A | 3/2005 |

(Continued)

OTHER PUBLICATIONS

Machine Translation JP2005287185 (Year: 2005).*

(Continued)

*Primary Examiner* — Jose A Gonzalez Quinones
(74) *Attorney, Agent, or Firm* — Crowell & Moring LLP

(57) ABSTRACT

To provide a linear motor and device which suppress contact of a movable element with a core. The linear motor includes: a movable element having a permanent magnet; and an armature having magnetic pole teeth located in an up/down direction of the movable element, a winding wound around the magnetic pole teeth, and an arm part extending in a right/left direction of the movable element. The movable element and the armature make relative movement in a front/back direction. The linear motor includes a protective member which is located between the arm part and the movable element and in which a movable element facing surface facing the movable element is located inside an outer end of the winding.

12 Claims, 5 Drawing Sheets

(56) References Cited

U.S. PATENT DOCUMENTS

| | | | | |
|---|---|---|---|---|
| 2003/0117600 A1* | 6/2003 | Taniuchi | ............. | G03F 7/70058 355/53 |
| 2005/0040712 A1* | 2/2005 | Hazelton | ............. | G03F 7/70875 310/58 |
| 2005/0280218 A1* | 12/2005 | Parison | ................. | H02K 41/02 280/5.5 |
| 2009/0015077 A1* | 1/2009 | Kim | ........................ | H02K 1/27 310/12.25 |
| 2011/0221283 A1* | 9/2011 | Kawakami | ........... | H02K 41/031 310/12.25 |
| 2011/0298308 A1* | 12/2011 | Aoyama | ................ | H02K 41/03 310/12.15 |
| 2015/0054357 A1* | 2/2015 | Heo | ..................... | H02K 41/031 310/12.18 |

FOREIGN PATENT DOCUMENTS

| | | | |
|---|---|---|---|
| JP | 2005-287185 A | | 10/2005 |
| JP | 2005287185 A | * | 10/2005 |
| JP | 2009038869 A | * | 2/2009 |
| JP | 2009-171665 A | | 7/2009 |
| JP | 2013-102695 A | | 5/2013 |
| WO | WO 2010/103575 A1 | | 9/2010 |

OTHER PUBLICATIONS

Machine Translation JP2009038869 (Year: 2009).*
International Search Report (PCT/ISA/210) issued in PCT Application No. PCT/JP2015/072441 dated Oct. 27, 2015 with English-language translation (Five (5) pages).
Japanese-language Written Opinion (PCT/ISA/237) issued in PCT/JP2015/072441 dated Oct. 27, 2015 (Four (4) pages).
Japanese-language Office Action issued in counterpart Japanese Application No. 2017-534028 dated Mar. 19, 2019 with English translation (five (5) pages).
Japanese-language Office Action issued in counterpart Japanese Application No. 2017-534028 dated Aug. 28, 2018 with English translation (five (5) pages).

* cited by examiner

LINEAR MOTOR AND DEVICE PROVIDED WITH LINEAR MOTOR

TECHNICAL FIELD

The present invention relates to a linear motor and a device provided with a linear motor.

BACKGROUND ART

A linear motor with a thrust generating mechanism has a shape like a cut-open rotary machine, in which a large magnetic attractive force is exerted between a movable element including a row of permanent magnets, and an armature. Therefore, there is a concern that the movable element may be attracted by the armature to cause the movable element to touch the armature.

Patent Literature 1 (PTL 1) and Patent Literature (PTL 2) disclose linear motors which have magnetic poles facing each other vertically with a permanent magnet between them to cancel the magnetic attractive force.

PTL 1 discloses a winding holding component 18 (0049, FIG. 29).

PTL 2 discloses a roller bearing 1 which supports a movable element (0012, FIG. 1).

CITATION LIST

Patent Literature

PTL 1: Japanese Patent Application Laid-Open No. 2013-102695

PTL 2: Japanese Patent Application Laid-Open No. 2003-244925

SUMMARY OF INVENTION

Technical Problem

The structure and function of the winding holding component 18 in PTL 1 are not disclosed in detail. In addition, if the structure of the winding holding component 18 is as shown in the figures, the part which supports the winding may be deformed by an external force or over time, thus making it impossible to suppress the winding from coming off. Furthermore, among the end faces of the winding holding component 18, the end face facing the movable element faces the core (magnetic body portion of the armature). For this reason, if the movable element touches the winding holding component 18, an impact might be transmitted to the core, thereby causing damage to the movable element or core.

In PTL 2, while the movable element is restrained in the z direction by the roller bearing 1, it is not restrained in the y direction. Therefore, if vibration, etc. causes the movable element to shift in the y direction and touch the core, the movable element or core might be damaged or the area where the permanent magnet and the magnetic pole teeth face each other might decrease, resulting in a decline in drive force.

Solution to Problem

The present invention made with the view of the above circumstances is a linear motor which includes a movable element having a permanent magnet, and an armature having magnetic pole teeth located in an up/down direction of the movable element, a winding wound around the magnetic pole teeth, and an arm part extending in a right/left direction of the movable element. The movable element and the armature make relative movement in a front/back direction. The linear motor includes a protective member which is located between the arm part and the movable element and in which a movable element facing surface facing the movable element is located inside an outer end of the winding.

DESCRIPTION OF EMBODIMENTS

Next, embodiments of the present invention will be described in detail, referring to the accompanying drawings. The same constituent elements are designated by the same reference signs and the same descriptions are not repeated. For the purpose of explanation, the terms "front/back, right/left, and up/down" directions which are perpendicular to each other are used. However, the direction of gravitational force need not be always downward and can be parallel to the upward, left, right, frontward or backward direction or a direction other than these directions.

First Embodiment

Figure 1:
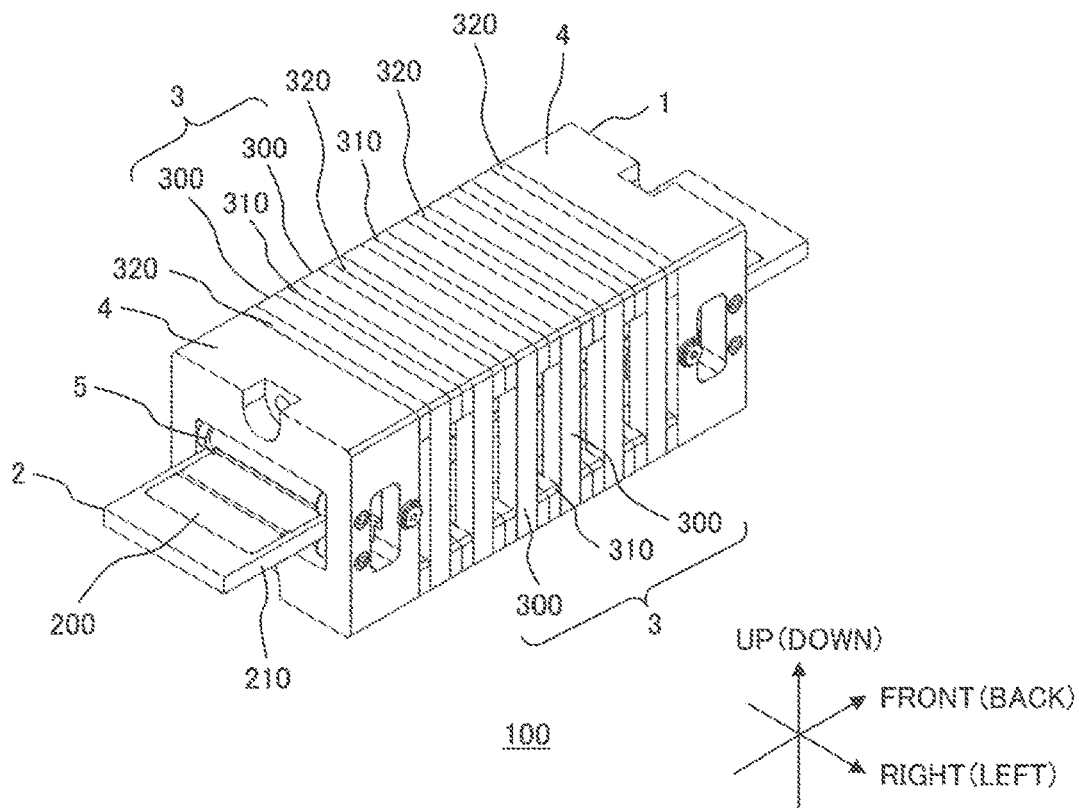
FIG. 1 is a perspective view of a linear motor according to a first embodiment.
Figure 2:
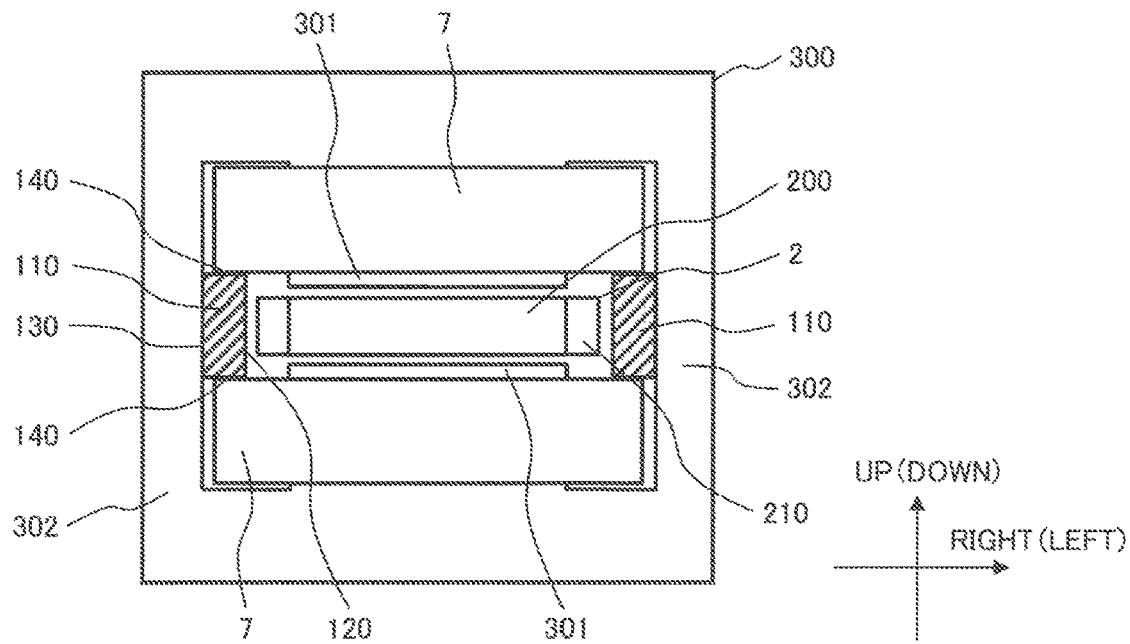
FIG. 2 is a sectional view of the linear motor according to the first embodiment, taken along a plane perpendicular to the front/back direction.

The explanation below is given on the assumption that the direction of gravitational force is downward. FIG. 1 is a perspective view of a linear motor 100 according to a first embodiment and FIG. 2 is a sectional view of the linear motor 100 according to the first embodiment, taken along a plane perpendicular to the front/back direction. The linear motor 100 includes a stator 1 and a movable element 2.

[Stator 1]

The stator 1 includes an armature 3 and end members 4 placed at both ends thereof in the front/back direction.

The armature 3 has a core 300 as a magnetic body. The stator 1 has one or two or more armatures 3 arranged in the front/back direction. In the armature 3, a non-magnetic spacer 320 as a non-magnetic body can be placed in the front/back direction. The armature 3 may be configured by connecting two or more cores 300 by a spacer 310 as a magnetic body. The stator 1 in this embodiment has three armatures 3 and in each armature 3, a spacer 310 is placed between two cores 300 arranged in the front/back direction. Consequently, a magnetic path which includes the two cores 300 and spacer 310 can be formed. By placing a non-magnetic spacer 320 between armatures 3 or between an armature 3 and an end member 4, magnetic flux leakage between the armatures 3 or magnetic flux leakage from the armature 3 to the end member 3 can be suppressed.

The end member 4 can be formed as a magnetic body or a non-magnetic body. A roller bearing 5 which supports the movable element 2 in the up/down direction is placed in the end member 4. The roller bearing 5 rotates in the front/back direction so that the movable element 2 and the end member 4 make relative movement in the front/back direction, and the roller bearing 5 suppresses the movable element 2 from being misaligned in the up/down direction. The end member 4 may be provided on only one side or both sides in the front/back direction. Also, the roller bearing 5 may be provided on only one side or both sides in the up/down direction. For example, the roller bearing 5 may be provided only on the lower side.

[Movable Element 2]

The movable element 2 includes one or two or more permanent magnets 200 arranged in the front/back direction and a permanent magnet fixing member 210 for fixing the permanent magnet(s), in which the front/back direction is its longitudinal direction. The permanent magnets 200 are each magnetized in the up/down direction and they are arranged so that their magnetization orientation directions are alternately inverted. In addition, the movable element 2 is placed in a space between two magnetic pole teeth 301 to be described later and between two arm parts 302. The permanent magnet 200 can be in the shape of a flat plate which is perpendicular to the up/down direction.

The permanent magnet fixing member 210 can have a ladder-like shape with an air gap into which the permanent magnet 200 is fitted and the permanent magnet 200 can be fixed using an adhesive agent or the like. Instead of the air gap, it may have a concave part to which the permanent magnet 200 is pasted.

[Core 300]

The core 300 includes magnetic pole teeth 301 placed over and under the movable element 2 and arm parts 302 for connecting these two magnetic pole teeth 301. The magnetic pole teeth 301 and arm parts 302 can be made by laminating electromagnetic steel sheets in the front/back direction. A winding 7 is wound around the magnetic pole teeth 301.

The arm part 302 is a magnetic body which extends vertically outside the winding 7 and the movable element 2 in the right/left direction, and it can guide a magnetic flux which is generated from the permanent magnet 200 and enters the magnetic pole teeth 301, to the other magnetic pole teeth 301 facing the magnetic pole teeth 301 concerned. Consequently, the core 300 can form a magnetic path which includes both the surfaces of the permanent magnet 200 facing the magnetic pole teeth 301, two magnetic pole teeth 301, and arm parts 302.

[Spacer 310]

The spacer 310 enables a magnetic flux flowing between adjacent cores 300 to pass. Therefore, the armature 3 with a spacer 310 between two cores 300 can form a magnetic path including two cores 300 and two permanent magnets 200, according to the design of the interval between permanent magnets 200 in the front/back direction or the like.

[Protective Member 110]

Figure 3:
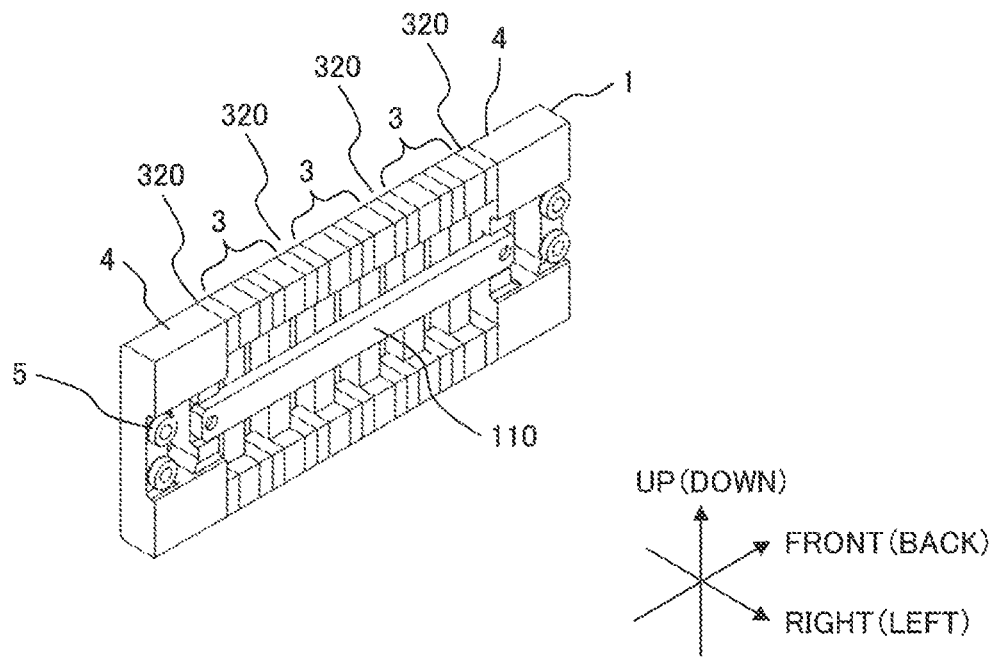
FIG. 3 is a sectional view of the linear motor according to the first embodiment, taken along a plane perpendicular to the right/left direction.

FIG. 3 is a sectional view of the linear motor 100 according to the first embodiment, taken along a plane perpendicular to the right/left direction. The protective member 110 is a member in which its thickness is in the right/left direction and its longitudinal direction is the front/back direction. The protective member 110 is fixed to the end members 4 placed on the front/back side of the armature 3, for example, with fixing members such as screws and is located between the arm parts 302 of the armatures 3 and the movable element 2.

In this embodiment, when three-phase current is supplied from an inverter (not shown) to the windings 7 of the three armatures 3 to magnetize the magnetic pole teeth 301, a thrust force is generated in the front/back direction by interaction of the movable element 2 with the permanent magnets 200 and the movable element 2 moves in the front/back direction. The movable element 2 might move in the right/left direction if an external force is applied.

Here, as illustrated in FIG. 2, the protective member 110 is placed between the arm part 302 and the movable element 2. Preferably the material of the protective member 110 is a non-magnetic body and/or a relatively soft material such as resin. As in this embodiment, when the protective member 100 extends in the front/back direction and is fixed at two points, for example, on the two end members 4, an easy-to-attach protective member 110 can be provided. Although the protective member 110 may be provided between the arm part 302 on one of the right and left sides and the movable element 2, it is preferable that it should be provided between the arm parts 302 on both sides and the movable element 2.

The protective member 110 in this embodiment is a solid member which has a movable element facing surface 120 facing the movable element 2, an arm part facing surface 130 facing the arm part 302, and winding facing surfaces 140 facing the winding 7. Specifically, the movable element facing surface 120 is nearer to the movable element 2 than the arm part facing surface 130 and the solid portion of the protective member 110 lies between the two winding facing surfaces 140 and between the arm part facing surface 130 and the movable element facing surface 120.

The protective member 110 is arranged so that the movable element facing surface 120 facing the movable element 2 is located inside the outer end of the winding 7 in the right/left direction. This suppresses the permanent magnet 200 from being located outside the magnetic pole teeth 301 or the outer end of the winding 7, thereby suppressing deterioration in the drive efficiency of the linear motor 100. Furthermore, the movable element facing surface 120 and the arm part facing surface 130 exist on the right and left sides with respect to the center of the winding facing surfaces 140 in the right/left direction and support the winding facing surfaces 140. This suppresses misalignment of the winding facing surfaces 140 of the protective member 110. Here, since the protective member 110 is solid, it can effectively suppress deformation over time or misalignment of the protective member 110 and thus suppress misalignment of the winding 7 and suppress the movable element 2 from being positioned outside the magnetic pole teeth 301 or the outer end of the winding 7. Therefore, the winding 7 is suppressed from touching the movable element 2 or the movable element 2 is suppressed from touching the arm part 302.

The protective member 110 has a winding facing surface 140 which is located outside the surface of the magnetic pole teeth 302 facing the movable element 2 in the up/down direction and faces the outer end of the winding 7. Therefore, it can support the winding 7 if the winding 7 is misaligned, so it can suppress the winding 7 from touching the movable element 2. In this case, the winding facing surface 140 is supported by the arm part facing surface 130, the movable element facing surface 120, and the solid structure in the up/down direction, so even if an external force is applied by the winding 7, deformation can be effectively suppressed. In short, the winding 7 can be effectively supported.

Second Embodiment

The structure of a second embodiment can be the same as that of the first embodiment except for the following points.

Figure 4:
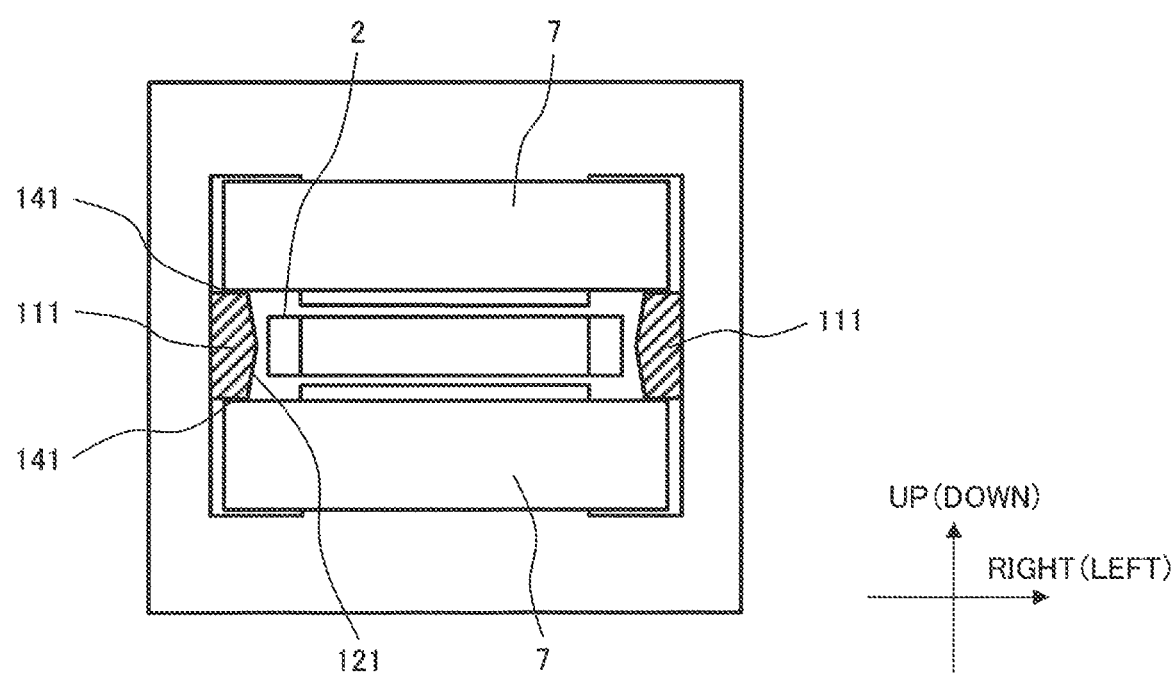
FIG. 4 is a sectional view of a linear motor according to a second embodiment, taken along a plane perpendicular to the front/back direction.

FIG. 4 is a sectional view of a linear motor according to the second embodiment, taken along a plane perpendicular to the front/back direction. In the protective member 111 in this embodiment, the surface 121 facing the movable element 2 is tapered toward the movable element 2.

If the movable element 2 touches the protective member 111, the area of contact between them can be small and thus sliding resistance can be decreased.

Third Embodiment

The structure of a third embodiment can be the same as that of the first or second embodiment except for the following points.

Figure 5:
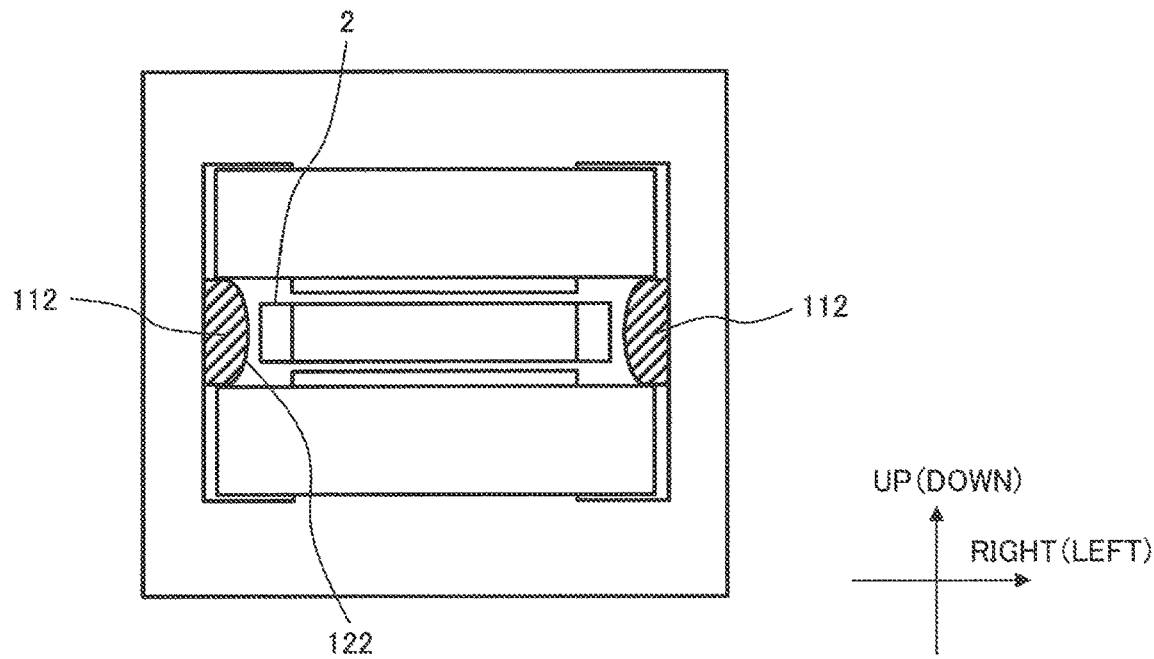
FIG. 5 is a sectional view of a linear motor according to a third embodiment, taken along a plane perpendicular to the front/back direction.

FIG. 5 is a sectional view of a linear motor 100 according to the third embodiment, taken along a plane perpendicular to the front/back direction. In the protective member 112 in this embodiment, the surface 122 facing the movable element 2 is a convex surface curved toward the movable element 2.

If the movable element 2 touches the protective member 112, the area of contact between them can be small and thus sliding resistance can be decreased.

Fourth Embodiment

The structure of a fourth embodiment can be the same as that of any of the first to third embodiments except for the following points.

Figure 6:
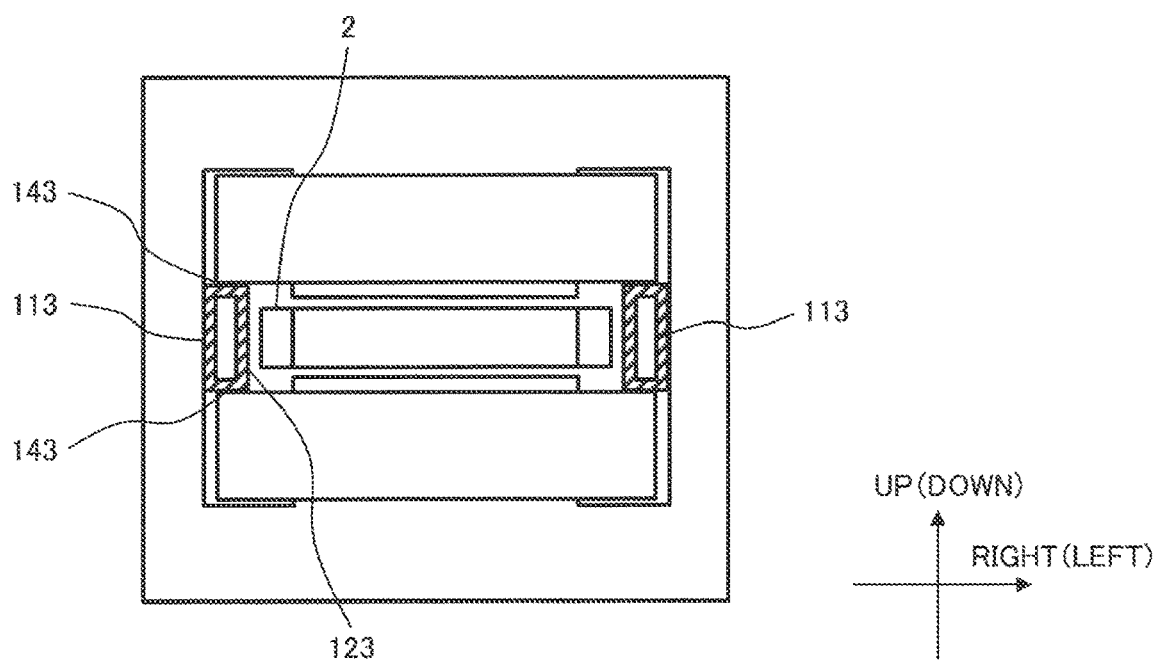
FIG. 6 is a sectional view of a linear motor according to a fourth embodiment, taken along a plane perpendicular to the front/back direction.

FIG. 6 is a sectional view of a linear motor 100 according to the fourth embodiment, taken along a plane perpendicular to the front/back direction. The protective member 113 in this embodiment is hollow. The two winding facing surfaces 143 are connected to each other by the movable element facing surface 123 and the arm part facing surface 113, thereby suppressing misalignment of the winding facing surfaces 143.

If the movable element 2 touches the protective member 113, the movable element facing surface 123 may be deformed outward in the right/left direction, so the impact of contact can be suppressed.

Fifth Embodiment

The structure of a fifth embodiment can be the same as that of any of the first to fourth embodiments except for the following points.

Figure 7:
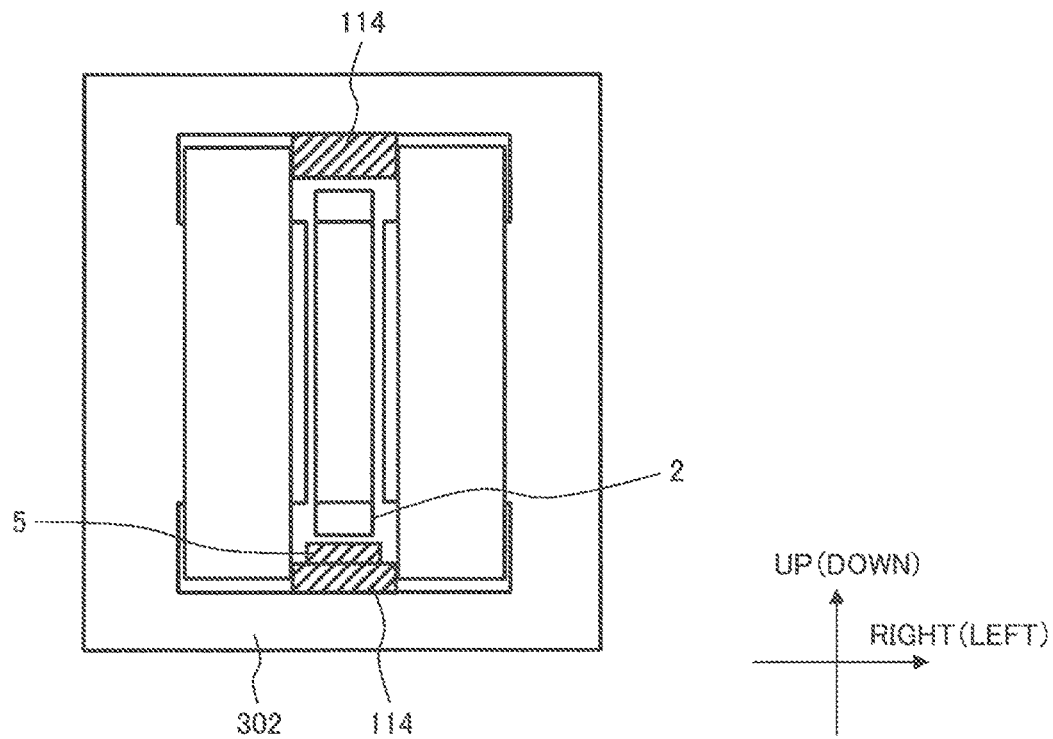
FIG. 7 is a sectional view of a linear motor according to a fifth embodiment, taken along a plane perpendicular to the front/back direction.

FIG. 7 is a sectional view of a linear motor 100 according to the fifth embodiment, taken along a plane perpendicular to the front/back direction. The linear motor 100 in this embodiment is structured so that the protective member 114 faces the movable element 2 in a direction parallel to the direction of gravitational force. A roller bearing 5 is placed between the movable element 2 and the arm part 302 on the downstream side of the movable element 2 in the direction of gravitational force, instead of, or in addition to, the protective member 114.

The roller bearing 5 can receive the gravitational force and guide the movable element 2 smoothly. The roller bearing 5 may be provided near any of the armatures 3 or near the end member 4. If it is placed near an armature 3, the roller bearing provided on the end member 4 may be omitted and if that is the case, the end member 4 can be small or omitted.

Sixth Embodiment

The structure of a sixth embodiment can be the same as that of any of the first to fifth embodiments except for the following points.

Figure 8:
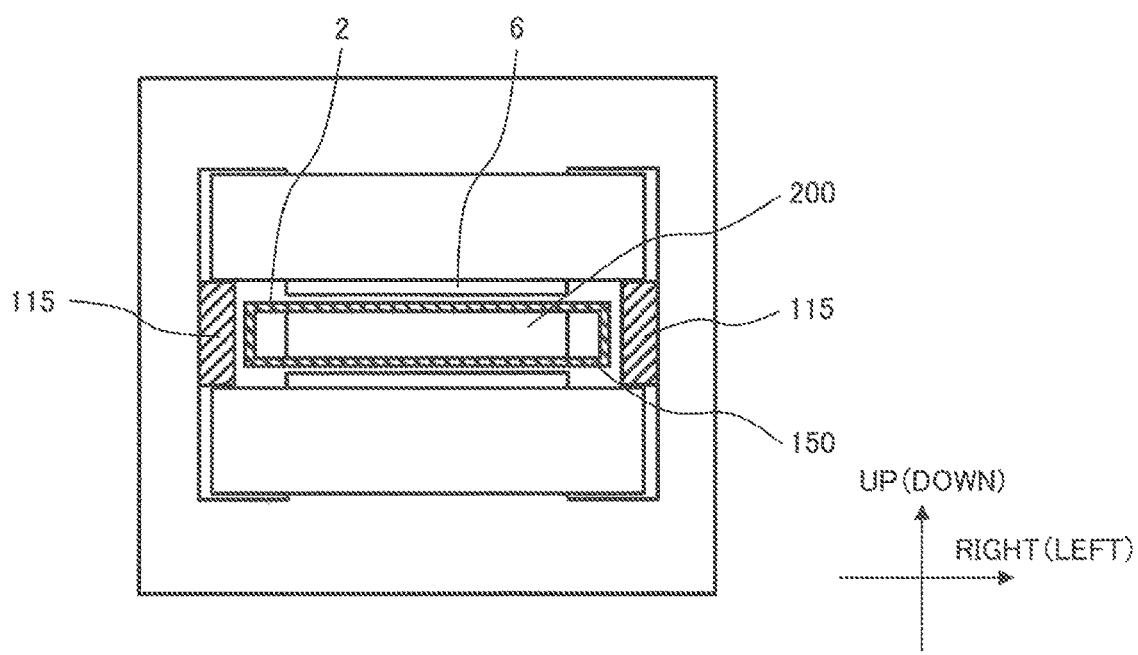
FIG. 8 is a sectional view of a linear motor according to a sixth embodiment, taken along a plane perpendicular to the front/back direction.

FIG. 8 is a sectional view of a linear motor 100 according to the sixth embodiment, taken along a plane perpendicular to the front/back direction. The movable element 2 in this embodiment is covered by a protective sheet 150.

If the linear motor 100 receives vibration from outside and thus the movable element 2 shifts in the right/left direction, since the protective member 115 is located right and left of the movable element 2, the protective member 115 touches the protective sheet 150. By using a material with good sliding properties for both of them, the sliding resistance can be decreased. For example, resin or carbon may be used for the protective sheet 150.

In addition, since the movable element 2 is covered by the protective sheet 150, this can suppress a fragment of the permanent magnet 200 from flying out and getting caught between the movable element 2 and the magnetic pole teeth 301 and interfering with driving of the movable element 2. For example, when the thickness of the protective sheet 150 is smaller than that of the protective member 115, lightness can be achieved. Alternatively, the protective sheet 150 may be provided only on the right and left sides of the movable element 2.

Seventh Element

The structure of a seventh embodiment can be the same as that of any of the first to sixth embodiments except for the following points.

Figure 9:
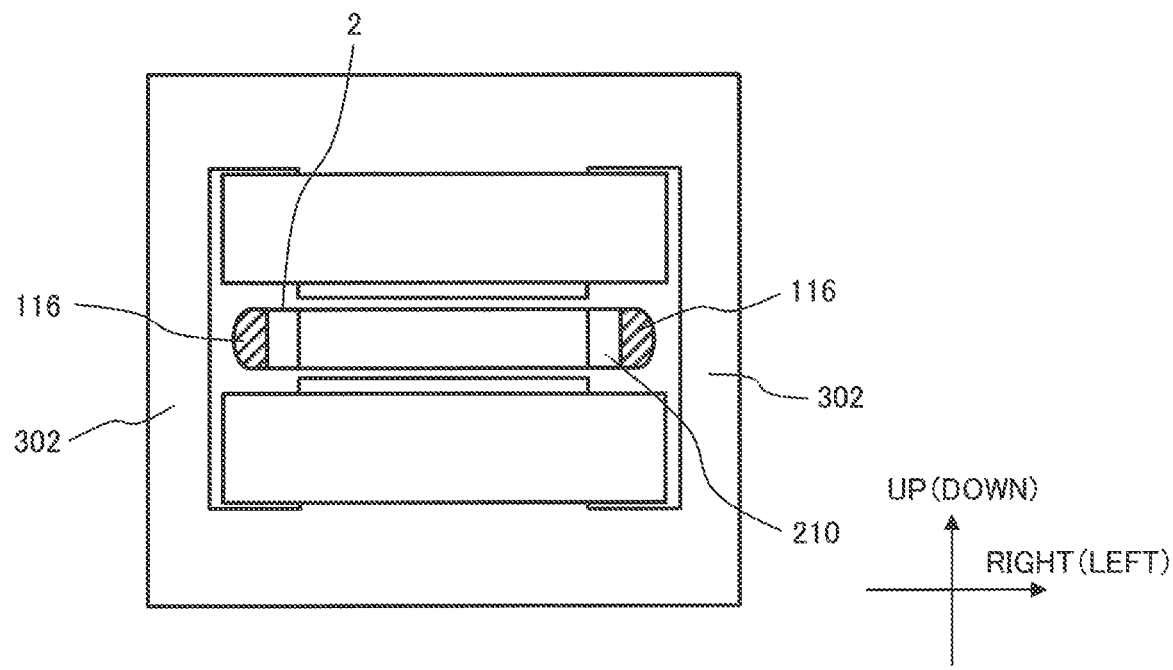
FIG. 9 is a sectional view of a linear motor according to a seventh embodiment, taken along a plane perpendicular to the front/back direction.

FIG. 9 is a sectional view of a linear motor 100 according to the seventh embodiment, taken along a plane perpendicular to the front/back direction. The protective member 116 in this embodiment is provided on the movable element 2 and located on one face of a permanent magnet fixing member 210 facing the arm part 302.

If the linear motor 100 receives vibration from outside and thus the movable element 2 shifts in the right/left direction, the protective member 116 touches the arm part 302 and the permanent magnet fixing member 210 does not touch the arm part 302 directly. If the arm part 302 and permanent magnet fixing member 210, both made of metal, should touch each other directly, the surfaces might be shaved or damaged but the protective member 116 suppresses damage to the permanent magnet fixing member 210 and arm part 302.

Eighth Embodiment

The structure of an eighth embodiment can be the same as that of any of the first to seventh embodiments except for the following points.

Figure 10:
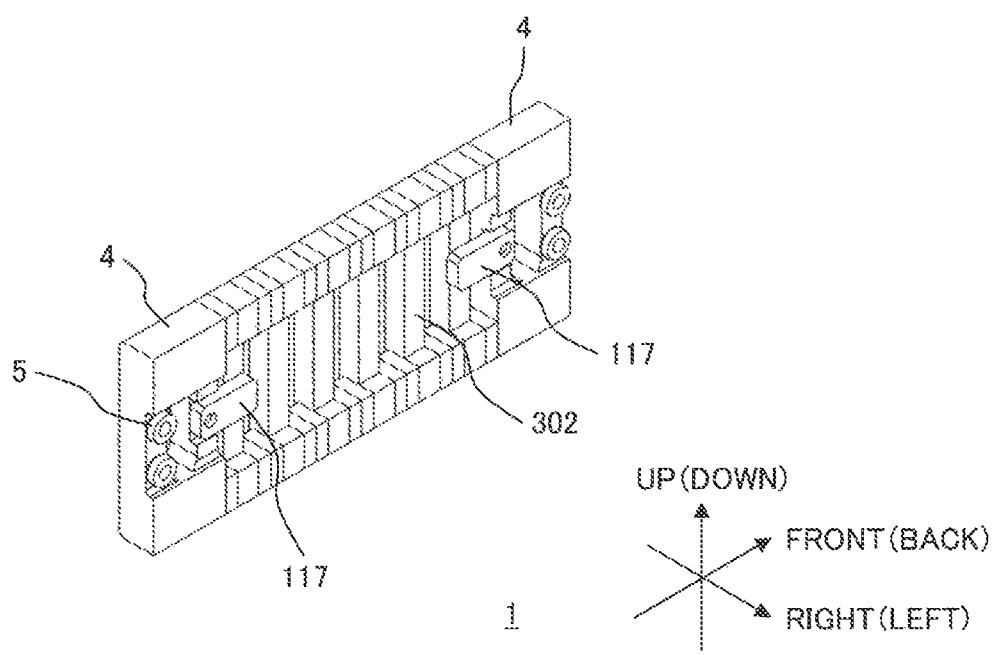
FIG. 10 is a sectional view of a linear motor according to an eighth embodiment, taken along a plane perpendicular to the right/left direction.

FIG. 10 is a sectional view of a stator 8 according to the eighth embodiment, taken along a plane perpendicular to the right/left direction. The protective member 117 in this embodiment is provided on the arm part 302 of only some of the armatures 3.

Since the length of the movable element 2 in the front/back direction is larger than the sum of lengths of armatures 3 of the stator 1 in the front/back direction, the above effects can be achieved even if the protective member 117 is not provided on the arm parts 302 of all the armatures 3. For example, when the protective member 117 is provided on some armatures 3 including an armature adjacent to the end member 4, the number of protective members 117 used can be decreased to make the linear motor 100 lighter.

In this embodiment, one end of the protective member 117 is fixed to the end member 4 and located between the arm part 302 of the armature 3 near the end member 4 and the movable element 2.

Ninth Embodiment

The structure of a ninth embodiment can be the same as that of any of the first to eighth embodiments except for the following points.

The protective member (not shown) in this embodiment is in the shape of a block which is fixed to some or all of the cores 300 in advance (for example, see FIGS. 2 and 10). Since cores 300 and spacers 310, 320 are arranged in the stator 1, when the protective member is fixed to the arm part 302 of a core 300 in advance, the necessity to carry out the step of fixing protective members after arranging the cores and spacers in the front/back direction and fixing them can be reduced. It is preferable that the size of the protective member in the front/back direction should be almost equal to or not more than the size of the core 300 in the front/back direction, since assemblability is improved by doing so.

Other Embodiments

The above explanation of each embodiment assumes that the armatures 3 are fixed and the movable element 2 moves, but it is allowed that conversely the movable element 2 is fixed and the armatures 3 are movable. Furthermore, instead of providing magnetic pole teeth 301 over and under the movable element 2, the magnetic pole teeth 301 may be provided either over or under the movable element 2. If that is the case, the arm part 302 can support the core 300 with one end of it in contact with the floor surface as a magnetic body.

In addition, the magnetic pole teeth 301 and the arm part 302 may be made as a lamination of amorphous metal or as a powder magnetic core. If an amorphous metal is used, it brings about an effect that iron loss generated in the magnetic pole teeth 301 or arm part 302 is reduced, and if a powder magnetic core is used, the shape can be arbitrarily made in a three-dimensional manner.

Furthermore, when the surface 120 of the protective member 110 which faces the movable element 2 is tapered or curved, if its inclined portion or arc portion is in the shape of a ladder, the same effects can be achieved.

The above explanation assumes that the roller bearing 5 is used as the linear motion bearing for supporting the movable element 2, but another type of linear motion bearing, such as a linear bearing or slide bearing, may be used.

Furthermore, the number of phases of the linear motor 100 is not limited and it may be three-phase, single-phase or the like.

The present invention can be applied not only to motors (linear motors) but also to various devices in which the stator 1 and the movable element 2 make relative movement. For example, even when it is applied to electric generators, compressors, electromagnetic suspensions, positioning devices and so on, the same effects can be achieved.

REFERENCE SIGNS LIST

1 . . . stator,
2 . . . movable element,
200 . . . permanent magnet,
210 . . . permanent magnet fixing member,
3 . . . armature,
300 . . . core,
301 . . . magnetic pole teeth,
302 . . . arm part,
4 . . . end member,
5 . . . roller bearing,
7 . . . winding,
100 . . . linear motor,
110-117 . . . protective member,
120-127 . . . movable element facing surface,
130-137 . . . arm part facing surface,
140-147 . . . winding facing surface,
150 . . . protective sheet

The invention claimed is:

1. A linear motor comprising:
   a movable element having a permanent magnet, and
   an armature having magnetic pole teeth located in an up/down direction of the movable element, a winding wound around the magnetic pole teeth, and an arm part extending in a right/left direction of the movable element, wherein
   the movable element and the armature make relative movement in a front/back direction, and
   a protective member, which is located between the arm part and the movable element and in which a movable element facing surface facing the movable element is located inside an outer end of the winding, is provided.

2. The linear motor according to claim 1, wherein
   the protective member has a solid structure, and
   the protective member has a winding facing surface which is located outside an end face of the magnetic pole teeth in the up/down direction and faces the winding, and an arm part facing surface which faces the arm part, and
   the winding facing surface is supported by the movable element facing surface, the arm part facing surface, and the solid structure.

3. The linear motor according to claim 1, wherein
   the protective member has a hollow structure, and
   the protective member has a winding facing surface which is located outside an end face of the magnetic pole teeth in the up/down direction and faces the winding, and an arm part facing surface which faces the arm part, and
   the winding facing surface is supported by the movable element facing surface and the arm part facing surface.

4. The linear motor according to claim 1, wherein the movable element facing surface is tapered or curved.

5. The linear motor according to claim 1, wherein
   the protective member has a shape extending in the front/back direction, and a fixing part for fixing each side of the protective member in the front/back direction is provided.

6. The linear motor according to claim 1, wherein the protective member is in the shape of a block fixed to the core.

7. The linear motor according to claim 1, wherein the protective member is a non-magnetic body.

8. The linear motor according to claim 1, wherein the movable element is covered by a protective sheet.

9. A device comprising the linear motor according to claim 1.

10. The linear motor according to claim 3, wherein a hollow portion of the protective member is empty.

11. The linear motor according to claim 4, wherein a center of the movable element facing surface projects toward the movable element.

12. The linear motor according to claim 6, wherein the block has a rectangular shape.

* * * * *